United States Patent [19]

Thacker et al.

[11] Patent Number: 4,999,100
[45] Date of Patent: Mar. 12, 1991

[54] LOW PROFILE FLUID CATALYTIC CRACKING APPARATUS AND PROCESS

[76] Inventors: Milton B. Thacker, 1590 Devonshire Dr., Salt Lake City, Utah 84108; John M. Limburg, 671 E. Walnut Brooke Dr., Murray, Utah 84107; Vincent J. Memmott, 335 W. Willowood Cir., Centerville, Utah 84104

[21] Appl. No.: 399,626

[22] Filed: Aug. 25, 1989

Related U.S. Application Data

[60] Division of Ser. No. 150,188, Jan. 29, 1988, abandoned, which is a continuation-in-part of Ser. No. 12,285, Feb. 9, 1987, abandoned, and a continuation-in-part of Ser. No. 127,945, Dec. 2, 1987, abandoned.

[51] Int. Cl.$^5$ .................. C10G 51/00; C10G 55/02; C10G 55/06
[52] U.S. Cl. .................. 208/155; 208/153; 208/161; 208/113; 422/142
[58] Field of Search .............. 208/156, 155, 161, 113, 208/153; 422/142

[56] References Cited

U.S. PATENT DOCUMENTS

| | | | |
|---|---|---|---|
| 2,302,209 | 11/1942 | Goddin, Jr. | 196/52 |
| 2,304,827 | 12/1942 | Jewell | 196/52 |
| 2,305,569 | 12/1942 | Degnen | 196/52 |
| 2,310,377 | 2/1943 | Voorhees | 196/52 |
| 2,311,273 | 2/1943 | Watson | 196/52 |
| 2,311,564 | 2/1943 | Munday | 196/52 |
| 2,312,230 | 2/1943 | Belchetz | 196/52 |
| 2,416,730 | 3/1947 | Arveson | 208/156 |
| 2,461,958 | 2/1949 | Bonnell | 208/156 |
| 2,521,195 | 9/1950 | Wheeler, Jr. | 23/284 |
| 2,690,990 | 10/1954 | Adams | 208/156 |
| 2,715,548 | 8/1955 | Fish | 302/29 |
| 3,554,903 | 1/1971 | Wilson | 208/164 |
| 3,619,415 | 11/1971 | Jones et al. | 208/164 |
| 3,639,228 | 2/1972 | Carr et al. | 208/153 |
| 3,661,800 | 5/1972 | Pfeiffer et al. | 208/155 |
| 3,687,841 | 8/1972 | Saxton et al. | 208/164 |
| 3,751,359 | 8/1973 | Bunn, Jr. | 208/155 |
| 3,785,963 | 1/1974 | Boyd et al. | 208/71 |
| 3,808,121 | 4/1974 | Wilson, Jr. | 208/113 |
| 3,879,281 | 4/1975 | Jones et al. | 208/164 |
| 3,886,060 | 5/1975 | Owen | 208/120 |
| 3,888,762 | 6/1975 | Gerhold | 208/120 |
| 3,902,990 | 9/1975 | Luckenbach | 208/164 |
| 3,923,642 | 12/1975 | Luckenbach et al. | 208/164 |
| 3,959,117 | 5/1976 | Bunn, Jr. et al. | 208/113 |
| 4,338,283 | 7/1982 | Sakamoto et al. | 422/112 |
| 4,436,613 | 3/1984 | Sagles | 208/156 |
| 4,464,247 | 8/1984 | Thacker | 208/134 |
| 4,479,870 | 10/1984 | Hammershaimb et al. | 208/164 |
| 4,584,090 | 4/1986 | Farnsworth | 208/155 |
| 4,591,425 | 5/1986 | Kovach et al. | 208/155 |
| 4,606,814 | 8/1986 | Hadd et al. | 208/161 |
| 4,692,335 | 9/1987 | Parker | 208/113 |

OTHER PUBLICATIONS

Proceedings of the First Int. Conf. on Circulating Fluid, Bed, Nov. 18–12, 1985, Edited by Prabu Basu, Centre for Energy Sluches, Tech Univ. of Canada.

Primary Examiner—Helane Myers
Attorney, Agent, or Firm—Workman, Nydegger & Jensen

[57] ABSTRACT

A succession of low profile catalyst chambers each housing a reservoir or catalyst are alternately connected in sequence by openings below the levels of the catalyst reservoirs and openings thereabove. The catalyst in all reservoirs is fluidized by a gas moving upwardly therethrough. Separate portions of the sequence of chambers are operated as reactor and regenerator sections according to the gas used to fluidize the catalyst in those sections. Other portions of the sequence of chambers are used to create inert atmospheric seals between the reactor and regenerator sections. The entire apparatus is configured as a low-profile catalytic cracker wherein the fluidized flow of the catalyst moves throughout the apparatus in an alternating lifting and dropping sequence.

4 Claims, 9 Drawing Sheets

LOW PROFILE FLUID CATALYTIC CRACKING APPARATUS AND PROCESS

This application is a divisional application of U.S. patent application Ser. No. 07/150,188, filed on Jan. 29, 1988, now abandoned, which is Continuation-in-Part of U.S. patent application, Ser. No. 012,285 filed Feb. 9, 1987, now abandoned, and of U.S. patent application, Ser. No. 127,945 filed Dec. 2, 1987, now abandoned.

BACKGROUND OF THE INVENTION

1. Field of the Invention

This invention relates to methods and apparatus for cracking hydrocarbonaceous feedstock, and more particularly to such methods and apparatus as utilize a powdered or granular catalyst in a fluidized state in order to achieve cracking of the feedstock.

2. The Present State of the Art

Fluidization of a powdered or granular material is the process by which the small solid particles of that material are caused to behave collectively like a fluid due to interaction with a fluidization medium, such as a gas or a liquid. If such fluidization mediums are passed upwardly through a bed of fine particles, the resulting frictional forces arising between the fluidization medium and the particles tend to counterbalance the weight of the particles. At a sufficiently high flow velocity in the fluidization medium the particles become suspended therein and the mixture behaves like a fluid.

In the field of petroleum refining, it is common to employ catalysts to stimulate the cracking of the large hydrocarbon molecules in heavy petroleum feedstock into smaller molecules from which conventional motor fuels, such as gasoline, jet fuel, kerosene, and diesel fuel, can be produced. The fluidization of such cracking catalysts in powdered or granular form was first attempted commercially in the early 1940s in an effort to efficiently contact heavy petroleum feedstock with small catalyst particles for cracking purposes. The resulting device, termed a fluid catalytic cracker, now occupies the heart of large modern petroleum refineries.

Since its beginning considerable changes have been made in fluid catalytic cracker technology. The introduction of new catalyst materials and the refinement of mechanical techniques and designs have enhanced the efficiency of the devices. Nevertheless, the mechanical configuration of the fluid catalytic cracker has remained basically the same. That configuration is characterized by massive, tall catalyst reservoir vessels supported by corresponding high-profile structural supports.

In a typical cracker one of the catalyst reservoirs functions as a reactor where the hydrocarbonaceous feedstock is actually cracked by its contact with a fluidized catalyst in a high temperature environment. In this process quantities of carbon by-product, or coke, are gradually deposited on the catalyst particles, rendering these progressively less effective for inducing cracking. Accordingly, a second catalyst reservoir commonly encountered in fluid catalytic cracking units is a regenerator. There coke deposited on the surface of the catalyst particles is burned off using an oxidizing gas, such as air. In this manner used catalyst from the reactor can be continuously recycled as it is used in the cracker. Also involved in a typical fluid catalytic cracker is auxiliary equipment external to the reactor and regenerator that is necessary to fluidize and to advance the solid catalyst, as well as to control the processes of reaction and regeneration.

It is important to maintain a seal between the atmosphere in the regenerator and the atmosphere in the reactor in order to prevent an explosion of the hot hydrocarbonaceous feedstock and cracked hydrocarbon by-products in the reactor. Nevertheless, used catalyst must be transported from the reactor to the regenerator and freshly regenerated catalyst must be supplied from the regenerator to the reactor.

Existing fluid catalytic cracking technology, which utilizes separate vessels for the reactor and regenerator, effects this essential seal through the use of tall reactor and regenerator vessels mounted on structures eighty to two hundred feet in height. In this manner the standing head of catalyst in the vessels and the lines therebetween is used to provide a seal which prevents the oxidizing atmosphere in the regenerator from contacting the hot hydrocarbon materials in the reactor. Typically the regenerator is located higher than the reactor, and a moving catalyst column in the transfer lines therebetween maintains the seal between the atmospheres in each.

The use of tall reactor and regenerator vessels, one or both of which must be supported off the ground, has resulted in modern refining units in which structural costs are a major component. The structural problems involved have been exacerbated by the weight of the large vessels due to the substantial quantities of catalyst to be housed in the vessels.

In many instances feedstock is injected into the catalyst in the transfer lines leading from the regenerator to the reactor. As a result a substantial amount of the cracking that takes place occurs in such riser lines as the mixture of catalyst and feedstock move upwardly prior to actually entering the reactor vessel. Accordingly, the reactor vessel in many instances, rather than serving as the major site of hydrocarbon cracking, functions primarily as a storage container for catalyst which is no longer active in the cracking process.

Continued use in modern refinery technology of huge reactor and regenerator vessels is largely a result of an adherence to the traditional form in which fluid catalytic crackers were first commercially embodied. In addition to causing an inefficient use of catalyst material, the presence of these large storage reservoirs presents other problems, such as the development of poor flow patterns and mixing as the catalyst is advanced through the system.

Ideally, in the reactor, each quantity of feedstock introduced should move through the reactor together with a given quantity of catalyst, which begins as fresh catalyst and after cracking feedstock moves on to the regenerator. This is called idealized plug flow. The cracking capability of catalyst is limited by the degree to which carbon by-product is deposited on the surface thereof. In idealized plug flow the full cracking capacity of a given quantity of catalyst is exhausted on the quantity of hydrocarbon feedstock originally introduced thereinto. Correspondingly, the maintenance of this type of idealized plug flow results in a situation in which newly introduced feedstock in the reactor consistently encounters fresh, rather than used catalyst, and thus cracks the feedstock in an optimally efficient manner.

Large catalyst vessels contain massive volumes of catalyst in which it is virtually impossible to maintain the desirable condition of idealized plug flow. In massive catalyst reservoirs, currents of catalyst commonly flow laterally or even backwards in relation to the predetermined flow direction of the device Both lateral mixing and catalyst backflow result in used catalyst failing to advance properly through the system. As a result, used catalyst tends to be mixed among the fresh catalyst into which new feedstock is introduced. This has the result of reducing the efficiency of the cracking operation.

In addition, in order to effect any flow at all, large, tall catalyst reservoirs of necessity involve high fluidizing pressures and correspondingly high catalyst velocities. This implies the need for expensive and heavy fluidization equipment, such as blowers, piping, and valves exterior to the catalyst vessels themselves. In addition, however, high fluidization pressures and the resulting high catalyst velocities in fluid catalytic crackers have several serious negative ramifications within the transfer lines and the catalyst vessels themselves.

Primary among these is the rapid breakdown or attrition of the catalyst material, as well as the erosion of the catalyst containers due to the abrasive quality of the fluidized catalyst mixture. Rapid catalyst attrition requires the introduction of new catalyst into the system on a regular basis, increasing the costs of operation. Catalyst vessel erosion causes high maintenance costs and substantial system down time to permit servicing and repair.

Conventional fluidized catalytic cracking processes, particularly those involving large catalyst reservoirs, have other drawbacks as well. Far too often these devices provide an overly long residence time during which feedstock and the cracked products thereof remain in the high temperature cracking environment of the reactor. Long residence times result in numerous secondary and undesirable side reactions in the hydrocarbonaceous feedstock. Such severe thermal cracking increases the production of less desirable gaseous products from the feedstock and unnecessarily loads the reactor and catalyst with coke. The result is a decreased yield of desirable condensable hydrocarbon products and used catalyst heavily ladened with coke.

By contrast, it is preferable that volatilized cracked hydrocarbon gases be removed promptly from the reactor vessel in order to minimize the occurrence of such reactions. Protracted residence times are, however, a predictable result of the poor flow and moving characteristics of conventional fluid catalytic crackers which depend on large, tall catalyst reservoirs.

SUMMARY OF THE INVENTION

The present invention seeks to resolve a number of the problems which have been experienced in the art, as identified above. More specifically, the apparatus and method of this invention constitute an important advance in the art of fluidized catalytic crackers, as evidenced by the following objects and advantages realized by the invention over the prior art.

One object of the present invention is a low profile fluidized catalytic cracker that eliminates the necessity for tall catalyst vessels, such as are required to provide an atmosphere seal between reactors and regenerators in conventional cracking units.

Yet another object of the present invention is a process and apparatus in which secondary thermal cracking of hydrocarbon products and the unnecessary accumulation of coke on catalyst in the reactor are reduced to a minimum.

Additionally, it is an object of the present invention to produce a fluidized catalytic cracking process and apparatus requiring a smaller quantity of catalyst per unit of processed hydrocarbon feedstock than is typically used in known methods and devices.

Still an additional object of the present invention is a fluidized catalytic cracker exhibiting close to idealized plug flow due to the reduction or elimination of lateral mixing and backflow.

Another object of the present invention is a process and apparatus for fluidized catalytic cracking of hydrocarbon feedstock in which the attrition rate of the catalyst is lowered relative to convention processes and apparatus.

A further object of the present invention is a method and apparatus for fluidized catalytic cracking in which container erosion due to catalyst movement is minimized.

Additional objects and advantages of the invention will be apparent from the description which follows, or may be learned by the practice of the invention.

Briefly summarized, the foregoing objects are achieved by an apparatus which comprises a plurality of low-profile catalyst cells arranged in succession. Each cell has a pair of catalyst chambers each housing in the bottom thereof a catalyst reservoir and thereabove an atmosphere reservoir. Adjacent catalyst chambers are in fluid communication in either a drop or a lift mode. In the drop mode catalyst reservoirs in adjacent catalyst chambers are connected by a catalyst opening below the surface of the catalyst reservoirs. In the lift mode the atmosphere reservoirs in adjacent catalyst chambers are connected by an atmosphere opening above the surface of the catalyst reservoirs.

The individual catalyst chambers in each pair of adjacent catalyst chambers, while communicating with each other in one of the two modes described, also communicate individually in the other mode with one of the catalyst chambers in some other pair. Thus, the apparatus comprises a sequence of low-profile catalyst chambers communicating alternately in the lift and drop modes.

A pneumatic means fluidizes the catalyst in the catalyst chambers and advances it laterally in a predetermined flow direction from one catalyst chamber to another. The pneumatic means comprises venting in the floors of the catalyst chambers by way of which a fluidizing medium and optionally a lift gas as well, is forced through the catalyst thereabove. The rate of flow of the fluidizing medium and lift gas through the venting in the floor of each catalyst chamber from which catalyst is lifted is such as to raise the surface of the catalyst reservoir in that chamber to the atmosphere opening at the top of the next chamber. Preferably the venting employed in the pneumatic means is so configured as to resist clogging with the catalyst when gas is not being forced therethrough. This facilitates startup of the apparatus.

The catalyst cells can be formed into a continuous recirculating loop. By using appropriate gases for the fluidization medium introduced at specific portions of the continuous loop, operation of distinct reactor and regenerator sections can be effected. In the reactor section the fluidization medium forced through the catalyst includes at least hydrocarbonaceous feedstock and steam. In some instances it is appropriate in addition to use light hydrocarbon cracking products termed plant gases. In the regenerator section, an oxidizing gas, such as air, is forced through the catalyst to combust the coke deposited thereon. Between the reactor and the regenerator sections, a number of intervening catalyst chambers can be interposed and operated as barrier sections for sealing and isolating the atmospheres of the regenerator and reactor sections from one another. A nonoxidizing gas such as steam is preferably used as the fluidization medium of the barrier sections.

Individual pairs of the catalyst chambers, or the entire succession thereof, may share common walls. Where this occurs between chambers communicating in the lift mode, the atmosphere opening therebetween is formed in the common wall. The catalyst opening between catalyst chambers that communicate in the drop mode and share a common wall is correspondingly formed through that common wall. In an additional layout feature, the regenerator and reactor sections may be side by side to one another so that waste heat generated by the combustion of coke in the regenerator section can be efficiently transferred to and utilized in the reactor section of the device.

In the method and apparatus described, tall catalyst vessels are entirely eliminated and no need exists for any substantial height differential between different portions of the system. Correspondingly, reduced fluidization medium pressures and velocities are required to fluidize and advance the catalyst. This results in lower catalyst attrition and reduced catalyst vessel erosion. These features contribute to a close to idealized plug flow, as well as substantially less secondary cracking in cracking hydrocarbonaceous feedstock. A highly efficient fluidized catalyst cracker results which enjoys lower capital installation costs and maintenance expenses than prior fluidized catalytic cracking methods.

BRIEF DESCRIPTION OF THE DRAWINGS

In order to more fully understand the manner in which the above-recited advantages and objects of the invention are obtained, a more particular description of the invention will be rendered by reference to specific embodiments thereof which are illustrated in the appended drawings. Understanding that these drawings depict only typical embodiments of the invention and are therefore not to be considered limiting of its scope, the presently preferred embodiments and the presently understood best mode of the invention will be described with additional detail through use of the accompanying drawings in which.

DESCRIPTION OF THE PREFERRED EMBODIMENT

A. FIG. 1

Figure 1:
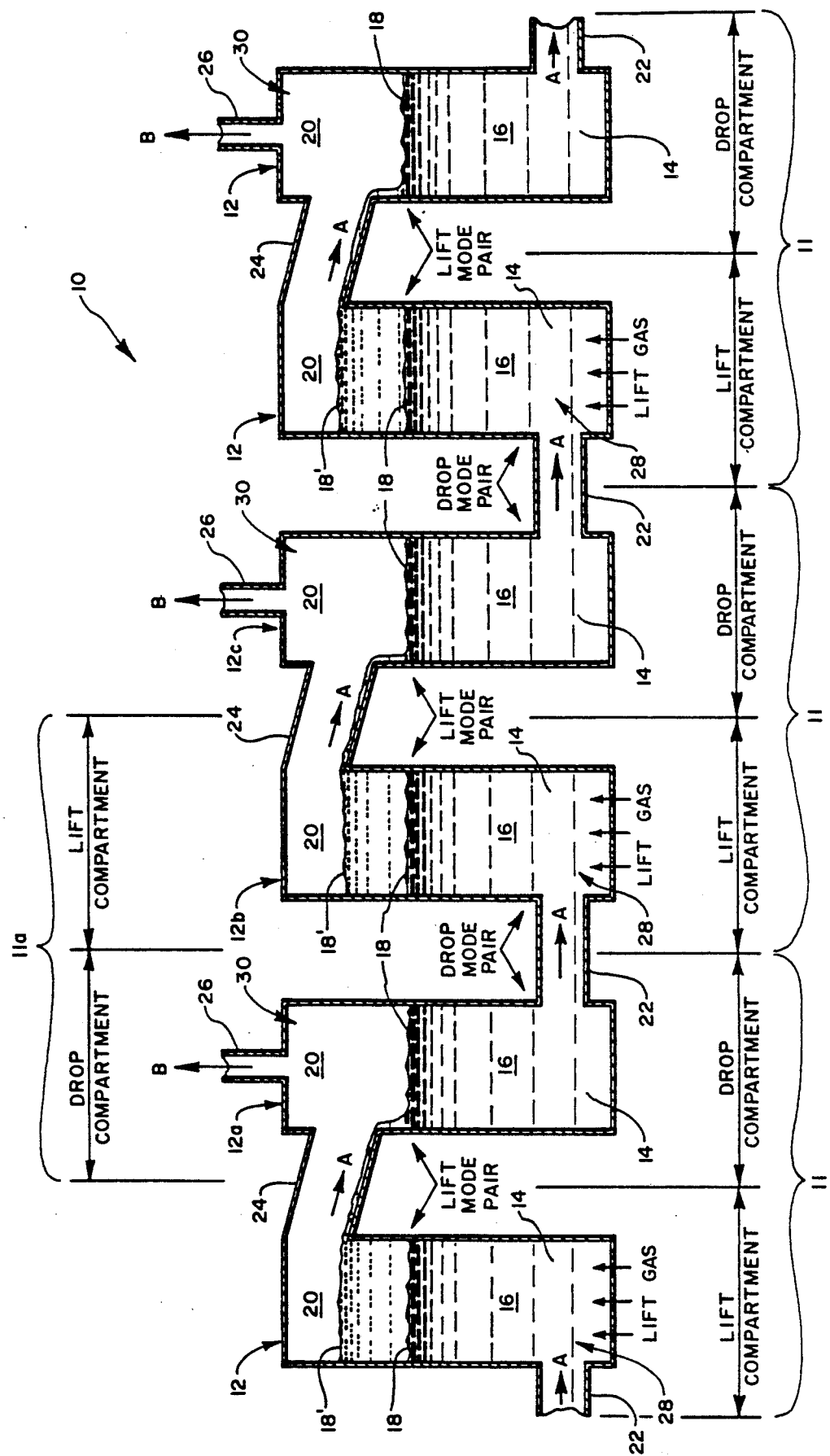
FIG. 1 is an elevation view of a portion of a fluid catalytic cracker incorporating teachings of the present invention shown in a schematic manner.

FIG. 1 provides an overview of the salient operating features of a portion of a first embodiment of a fluid catalytic cracker 10 embodying teachings of the present invention. As hereinafter more fully explained, the portion of catalytic cracker 10 illustrated in FIG. 1 could function equally well as the reactor section, the regenerator section, or even an atmosphere-isolating barrier section in an apparatus for cracking hydrocarbonaceous feedstock through contact of the feedstock with a catalyst.

Catalytic cracker 10 comprises a plurality of successive catalyst cell means each comprising a pair of chambers 12 through which catalyst 14 advances in a predetermined flow direction indicated by arrows A. Each cell means is designated by a bracket 11, and comprises two adjacent catalyst chambers 12, one of which serves as a lift compartment, the other a drop compartment, as schematically shown at 11, or in the alternative, as shown at 11a. As illustrated in FIG. 1, and as described further below, the catalyst cell means 11 or 11a are arranged in succession and are connected in fluid communication with one another so as to provide a continuous flow path from one cell means to the next.

Catalyst 14 housed in the bottom of each catalyst chamber 12 forms a catalyst reservoir 16. Above the top surface 18 of each catalyst reservoir 16 catalyst chambers 12 provide an atmosphere reservoir 20. Catalyst 14 in each catalyst reservoir 16 is fluidized by forcing a fluidizing medium such as gas through the catalyst from the floor of catalyst chamber 12 upwardly. This may be accomplished in any number of known manners, or preferably by using structure to be described subsequently in relation to other figures of this disclosure. Nevertheless, for the purpose of simplifying the illustration contained in FIG. 1 and the discussion pertaining thereto, it should be understood that the catalyst 14 as illustrated is in a fluidized state. Thus, catalytic cracker 10 includes a pneumatic means for fluidizing catalyst 14 in catalyst chambers 12 and for advancing catalyst 14 therethrough in the predetermined flow direction indicated by Arrow A.

Each adjacent pair of catalyst chambers 12 is in fluid communication in one of two characteristic modes, either a drop mode or a lift mode. Catalyst chambers 12a and 12b exemplify a pair of adjacent catalyst chambers in fluid communication in the drop mode. Catalyst chambers 12a and 12b are connected by a catalyst opening 22 below top surfaces 18 of catalyst reservoirs 16 in each. The fluid communication between catalyst chambers 12a and 12b afforded by catalyst opening 22 permits fluidized catalyst 14 to move from chamber 12a to chamber 12b. Catalyst 14 received in chamber 12a from the preceding chamber displaces fluidized catalyst in chamber 12a from top to bottom, thus causing the predetermined flow direction indicated by Arrow A into catalyst chamber 12b.

Catalyst chambers 12b and 12c exemplify a pair of catalyst chambers which are in fluid communication in the lift mode. Atmosphere reservoirs 20 in catalyst chambers 12b and 12c are connected by an atmosphere opening 24 which is above surface 18 of catalyst reservoirs 16 housed therein. The fluid communication afforded by atmosphere opening 24 between catalyst chambers 12b and 12c permits flow of fluidized catalyst from chamber 12b to chamber 12c.

Thus, in summary, as schematically represented in FIG. 1 it will be seen that in each cell means 11 or 11a there is a pair of adjacent catalyst chambers 12 which are in fluid communication in either the lift mode or the drop mode. Accordingly, fluidized catalyst is lifted upwardly in one of the catalyst chambers of the cell means until it reaches essentially the top of that catalyst chamber, where it then flows through an atmosphere opening 24 and is dropped into the next adjacent catalyst chamber.

As will be further appreciated, each catalyst chamber 12 of a cell means 11 or 11a is also in fluid communication with an adjacent catalyst chamber 12 of another cell means. Thus, for example, each of catalyst chambers 12a and 12b of cell means 11a, which are in fluid communication with each other on one side in the drop mode, also communicate on the other side in the lift mode with another adjacent catalyst chamber of other cell means 11a. Catalyst chamber 12b communicates in the lift mode with catalyst chamber 12c, while catalyst chamber 12a communicates in the lift mode with a catalyst chamber that is located upstream in the predetermined flow direction indicated by Arrow A.

In the alternative, if the cell means is defined as represented at brackets 11, catalyst chambers 12b and 12c of cell means 11 which are in fluid communication with each other on one side in the lift mode, each communicate in the drop mode on the other side with individual catalyst chambers 12 of other cell means 11. Catalyst chamber 12b communicates in the drop mode with catalyst chamber 12a, while catalyst chamber 12c communicates in the drop mode with the next catalyst chamber downstream in the predetermined flow direction indicated by Arrow A. Thus, irrespective of whether the cell means is defined as represented at 11 or 11a, catalytic cracker 10 comprises a sequence of catalyst chambers 12 alternately communicating throughout that sequence in the lift and drop mode. Thus, catalyst is lifted through one chamber, dropped into the next, then lifted again, then dropped, and so forth.

As mentioned earlier, gas injected into catalyst 14 through the bottom of each catalyst chamber 12 is used to fluidize catalyst reservoir 16 therein. The fluidization gas exits catalyst chambers 12 through a vent 26 at the top of each drop compartment 30. By virtue of atmosphere opening 24 between each pair of catalyst chambers 12 communicating in the lift mode, only a single vent 26 is required for this purpose.

An additional component of gas flow is preferably utilized in the pneumatic means of the present invention for advancing catalyst 14 through catalyst chambers 12 thereof in the predetermined flow direction. The depth of a fluidized bed, such as one of catalyst reservoirs 16, is directly affected by the volume of fluidizing medium being passed therethrough. Accordingly, in alternate catalyst chambers 12 which serve as lift compartments, a substantially increased volume of gas is forced through the catalyst 14 housed therein. This additional volume of gas is depicted schematically in FIG. 1 and labeled elsewhere throughout the drawings as "lift gas." As a result of the volume of lift gas, the depth of catalyst reservoir 16 thereabove is increased, so that top surface 18 thereof is raised upwardly to the level of top surface 18' at the level of atmosphere opening 24.

The effect of raising the top surface 18 of catalyst reservoir 16 to the level of top surface 18' is to induce catalyst 14 to enter atmosphere opening 24 communicating therewith. Thereupon catalyst 14 advances through each atmosphere opening 24 in the predetermined direction indicated by Arrow A to enter the catalyst reservoir 16 in the successive catalyst chamber 12. Thereafter, the lift gas exits from catalyst chambers 12 through vent 26 with the gas used to fluidize catalyst reservoir 16.

It is important to retain the same average particle size in the fluidized bed of catalyst so that differential pressures do not vary, and so that catalyst activity remains more uniform throughout the apparatus. To this end, it is important to remove catalyst from the fluidization and lift gases exiting through vent 26 As hereinafter more fully explained in reference to others of the embodiments illustrated, this may be advantageously accomplished through the use of external cyclones in combination with appropriate fluid passageways permitting return of the catalyst to its previous mass or identity as it flows through the system. Accordingly, as will be hereinafter more fully explained, catalyst which exits through vent 26 with fluidization and exit gases is separated from those gases and is returned to the same cell means from which it exited so that such returned catalyst goes through the system with essentially the same mass of fluidized catalyst. In this manner, the average relative particle size of the catalyst is maintained more nearly uniform throughout its travel through the system.

Because of the differentiated functioning of adjacent catalyst chambers 12 in each cell 11 or 11a, such as catalyst chambers 12b and 12c, different reference terminology will hereinafter be used for each. A catalyst chamber, such as catalyst chamber 12b, in which lift gas raises the surface of the catalyst reservoir 16 will be referred to as a lift compartment. Lift compartments, while catalyst chambers, will also be more specifically identified in FIG. 1 by reference character 28. Similarly, catalyst chambers such as catalyst chamber 12c into which catalyst 14 drops through an atmosphere opening 24 from a lift compartment 28 will be termed drop compartments. In FIG. 1 drop compartments, while catalyst chambers in their own right, will also be more specifically identified by the reference character 30.

As catalyst 14 advances through alternating lift compartments 28 and drop compartments 30 in the predetermined flow direction indicated by Arrow A, the gas in atmosphere reservoir 20 contained above each adjacent pair of lift and drop compartments 28, 30, respectively, is effectively isolated from the gas in the atmosphere reservoirs 20 contained in preceding or succeeding pairs of adjacent lift and drop compartments 28 and 30.

Thus, through the arrangement shown in FIG. 1, it is possible to laterally advance a fluidized bed of catalyst while sealing from contact the atmospheres of each pair of adjacent lift and drop compartments. This atmospheric seal, effected in a plurality of successive pairs of catalyst chambers, is utilized in the catalytic cracker of the present invention as a substitute for the atmospheric seal between the reactor and regenerator sections effected in conventional fluid catalyst crackers by high-profile catalyst vessels supported at different heights with long riser lines therebetween.

Importantly, as will be readily appreciated, the arrangement of catalytic cracker 10 lends itself to a low-profile structure which need not involve tall or massive catalyst vessels. In addition, low-profile catalyst vessels, such as catalyst chambers 12, do not require high gas pressures to effect fluidization or advancement of the catalyst utilized. This predictably will reduce catalyst attrition and the internal erosion of the catalyst chambers 12. Furthermore, the absence of massive catalyst reservoirs in catalytic cracker 10 reduces substantially the problems of laterally mixing and backflow encountered in known devices. Nearly idealized plug flow characteristics result with corresponding highly efficient cracking. Thus, the inventive principles as broadly represented in the apparatus 10 represent an important advance in the state of the art.

As will be seen in subsequent embodiments of the invention disclosed herein, the use of relatively small catalyst reservoirs 16 in pairs of catalyst chambers 12 communicating in the lift mode permits the rapid passage through the catalyst 14 therein of gases used as a fluidization medium and as a lift gas. Such gases pass once through a relatively short column of catalyst 14 in each catalyst chamber 12, then promptly enter atmosphere reservoir 20 and are drawn away through vents 26. Where the reactor section of a fluid catalytic cracker is constructed according to the principles illustrated by catalytic cracker 10, this means that the residence time of hydrocarbonaceous feedstock introduced into the catalyst chambers 12 of the reactor section as a component of the gas used as a fluidization medium or lift gas is of relatively short duration. Secondary cracking can thus reliably be eliminated.

In a preferred method of use of the apparatus, one or more successive pairs of catalyst chambers 12, such as those shown in FIG. 1, can function as a reactor section in which hydrocarbonaceous feedstock is cracked. To accomplish this catalyst 14 would flow through such a reactor section in the manner described in relation to FIG. 1 from an input end thereof which receives fresh catalyst to an output end thereof from which used catalyst is discharged. In the process, the gas with which catalyst 14 is fluidized would typically comprise a mixture of steam and heated hydrocarbonaceous feedstock. In some embodiments to be discussed subsequently, it may also be desirable for precise control of the residence time between the feedstock and the reactor environment to utilize in portions of the reactor section otherwise undesirable light, uncrackable plant gas mixed with steam. Under such circumstances, used catalyst discharged from the output end of such a reactor section could be transferred to a traditional high-profile catalyst vessel containing a catalyst bed which functions as a regenerator.

However, it is also possible to employ in the regenerator section of a fluid catalytic cracker the principles illustrated in apparatus 10, thereby eliminating the need for a high-profile regenerator vessel. Under such circumstances a plurality of successive pairs of catalyst chambers 12 would function as a regenerator section in which impurities are removed from used catalyst. The gas injected through the catalyst 14 in those catalyst chambers would then necessarily comprise an oxidizing gas, such as air. Catalyst would then flow through such a regenerator section in the manner described in relation to FIG. 1, from an input end which receives used catalyst to an output end from which fresh catalyst is discharged. The fresh catalyst could then be recycled to either a reactor section of traditional high-profile configuration or one configured in the manner of apparatus 10 of FIG. 1.

It is also possible to use a non-volatile, non-oxidizing gas, such as steam, as the fluidizing and lift gases in a sequence of catalyst chambers 12, such as shown in FIG. 1. If placed between the ends of a reactor section and a regenerator section in a fluid catalytic cracker, such a sequence of catalyst chambers 12 could function as a barrier section for effecting isolation of the atmospheres in the reactor and regenerator from each other, while nevertheless permitting catalyst 14 to flow from one to the other. While such a barrier section could in theory be utilized between traditional massive high-profile reactor and regenerator vessels, in the presently preferred embodiments of the invention the reactor and regenerator sections as well as the barrier sections are all similarly configured of low-profile catalyst chambers 12. Under such circumstances the plurality of pairs of catalyst chambers could be formed into a continuous closed loop in the manner shown in FIG. 2.

B. FIG. 2

Figure 2:
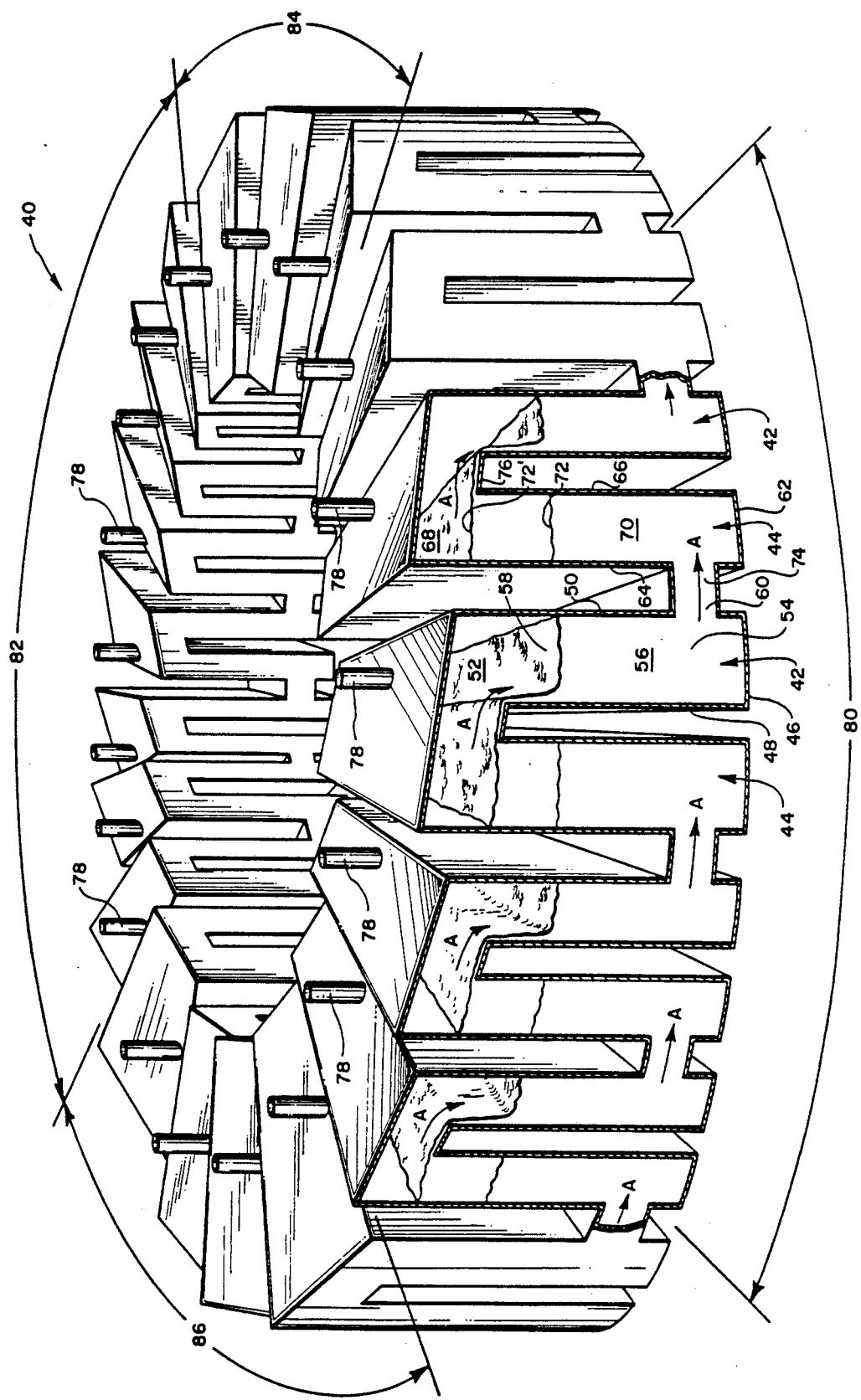
FIG. 2 is a perspective view in partial cross-section of a second embodiment of a fluidized catalytic cracker incorporating in a continuous loop the principles illustrated in FIG. 1.

FIG. 2 depicts a second embodiment of a fluid catalytic cracker 40 incorporating teachings of the present invention illustrated in FIG. 1 and configured as a closed succession of alternating drop compartments 42 and lift compartments 44 similar to those described in relation to FIG. 1. Each drop compartment 42 has a floor 46 and sidewalls 48, 50. Housed therein is an atmosphere reservoir 52 and therebelow, a catalyst reservoir 56 having a top surface 58. Catalyst 54 enters each drop compartment 42 through the atmosphere reservoir 52 contained therein and flows out of each drop compartment 42 in the predetermined flow direction indicated by arrow A through an opening 60 in sidewall 50 below top surface 58 of catalyst reservoir 56.

Similarly, each lift compartment 44 has a floor 62 through which lift gas is injected in the manner described in FIG. 1 and sidewalls 64, 66. Provided in each lift compartment 44 is an atmosphere reservoir 68 at the top thereof, and below that, a catalyst reservoir 70 having a top surface 72. Catalyst 54 enters each lift compartment 44 through an opening 74 in sidewall 64 below top surface 72 of catalyst lift reservoir 70. Each drop compartment 42 and the succeeding lift compartment 44 are thus in fluid communication in the drop mode as discussed in relation to FIG. 1. Fluidization of catalyst 54 in reservoirs 56 and 70 permits top surfaces 58, 72 to be maintained at a relatively similar level, despite the addition or discharge of catalyst 54 from either.

An atmosphere opening 76 communicates with each gas reservoir 68, 52. The injection of lift gas through floor 62 of each lift compartment 44 in addition to the fluidization medium used therein results in the raising of top surface 72 of catalyst lift reservoir 70 to the level of top surface 72'. Thereupon, catalyst 54 is discharged in the predetermined flow direction indicated by arrow A, leaving lift compartment 44 and entering succeeding drop compartment 44.

Fluidization and lift gases introduced into atmosphere reservoir 52 are drawn therefrom through vents 78. As previously indicated, catalyst 54 is preferably returned to the cell from which it exited Catalyst 54 thus advances uniformly through the compartments of catalytic cracker 40 laterally in a lifting and dropping movement.

As schematically illustrated, a plurality of successive lift compartments 44 and drop compartments 42 can function as a reactor section 80 in which feedstock is cracked, if the gas forced through catalyst 54 therein by the pneumatic means of the invention comprises used feedstock mixed with steam. Other successive lift compartments 44 and drop compartments 42 in the closed sequence of catalytic cracker 40 can function as a regenerator section 82 in which impurities are removed from used catalyst. In this instance, the pneumatic means of the invention forces a gas which is an oxidizing agent through catalyst 54 in that portion of catalytic cracker 40.

Interposed between reactor section 80 and regenerator section 82 are a plurality of successive lift compartments 44 and drop compartments 42 which function as barrier sections 84, 86 for isolating the atmosphere in reactor section 80 from the atmosphere in regenerator section 82. This is accomplished by forcing a gas which is non-combustive and non-oxidizing, such as steam, through catalyst 54 in barrier sections 84, 86.

C. FIGS. 3-4

Figure 4:
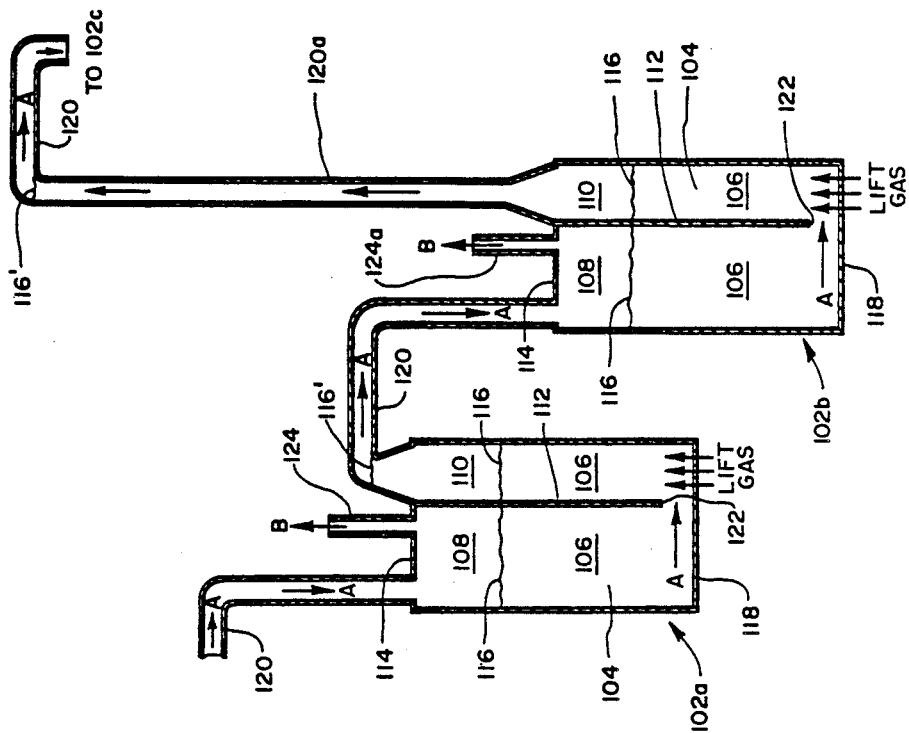
FIG. 4 is a cross-sectional elevation of the catalytic cracker of FIG. 3 taken along section line 4—4.
Figure 3:
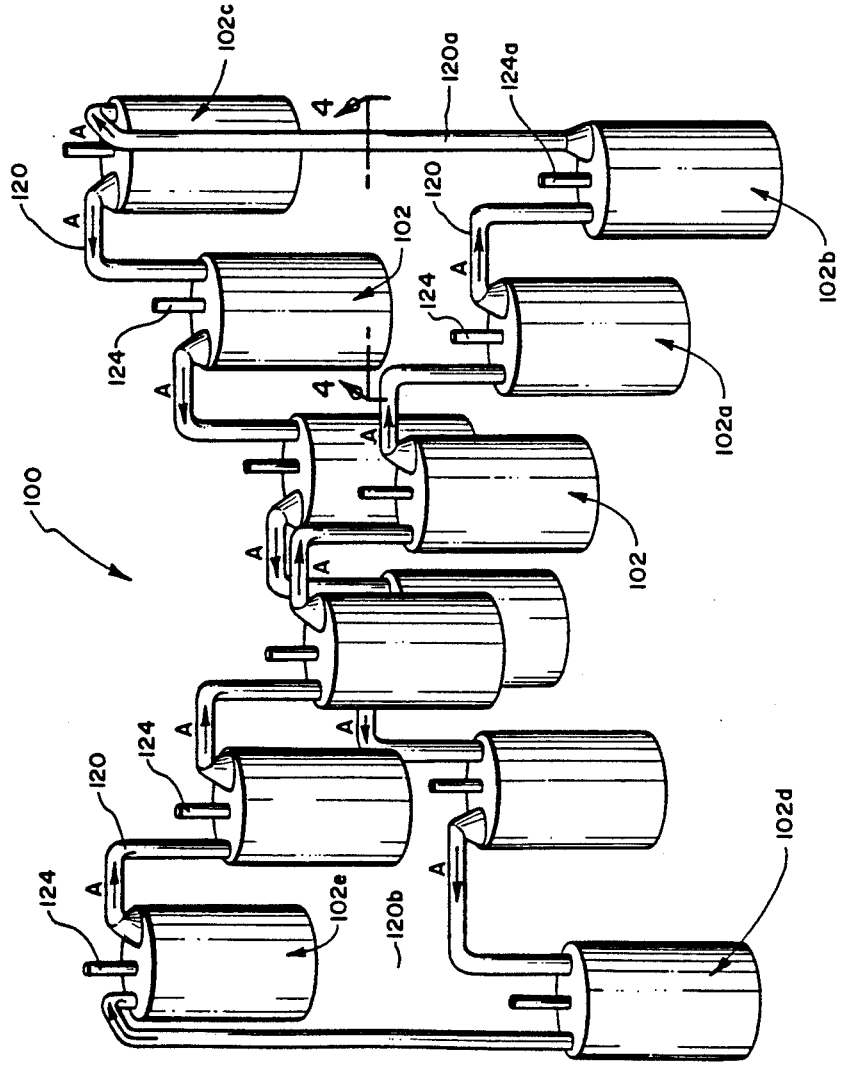
FIG. 3 is a perspective view of a third embodiment of a fluidized catalytic cracker patterned according to the present invention.

FIGS. 3 and 4 taken together illustrate yet a third embodiment of a fluid catalytic cracker 100 embodying principles of the present invention. While catalytic crackers 10 and 40 discussed earlier do not require significant vertical displacement between successive catalyst chambers, it is possible, nevertheless, to utilize the principles explained in relation to FIG. 1 in a closed succession of catalyst vessels as shown in FIG. 2 and yet employ vertical differentiation.

Catalyst cracker 100 is such a device, comprising a closed succession of enclosed catalyst cells 102, each housing therein a quantity of catalyst 104 forming a catalyst reservoir 106. Each cell 102 is provided with a partition 112 for separating the space above catalyst reservoirs 106 into an input atmosphere chamber 108 and an output atmosphere chamber 110. As shown in FIG. 4, the partition 112 depends from roof 114, while connecting the opposite sides of catalyst vessels 102. Partition 112 extends downwardly below the top surface 116 of catalyst reservoir 106, and terminates short of floor 118 to afford fluid communication in the drop mode.

Catalyst 104 enters a cell 102 through input atmosphere chamber 108 and is discharged through output atmosphere chamber 110. Communicating with each output atmosphere chamber 110 is a discharge passageway 120 through which this discharge of catalyst is effected. Venting (not shown) in floors 118 is used to fluidize catalyst 104 and to cause catalyst 104 to advance through the sequence of cells 102.

As in the case of FIG. 1, only the lift gas, which is used to induce catalyst advancement, is shown in FIG. 4 for the sake of simplicity. However, it should be understood that a fluidization gas is also used in each cell 102. A quantity of a lift gas in addition to the fluidization medium used in catalyst vessel 102 is forced through the portion of catalyst reservoir 106 directly below output atmosphere chamber 110. As a result, top surface 116 of catalyst reservoir 106 rises to the level of top surface 116', whereby catalyst 104 can advance through catalyst discharge passage 120 to the next cell 102.

The arrangement of catalytic cracker 100 with cells 102 in a vertically displaced relationship is particularly advantageous for use in designs of catalytic crackers requiring high pressure operation. As seen in FIG. 3, cell 102e is the highest cell in a downwardly cascading series of six cells, terminating in cell 102b. As best understood by reference to FIG. 4, the quantity of lift gas required in cell 102a to advance catalyst 104 to cell 102b is substantially less than the quantity of lift gas required to advance catalyst 104 from cell 102b to cell 102c by way of high-profile catalyst discharge passage 120. It is one advantage of a fluid catalytic cracker configured according to the present invention that the quantity of lift gas used in individual cells can be independently manipulated according to the chemical and mechanical requirements of the apparatus.

Following arrival in cell 102c, catalyst 104 cascades downwardly through a second succession of six cells 102 terminating in cell 102d. Thereafter, a major lifting of the catalyst moves catalyst 104 up high-profile catalyst discharge passage 120b to catalyst vessel 102e. As in the apparatus 40 of FIG. 2, various sections of the apparatus 100 can be operated as separate reactor, regenerator, and barrier sections by varying the type of fluidization and lift gas utilized therein.

A further comment is in order with regard to a structural comparison of the separate drop compartments 42 and lift compartments 44 in FIG. 2 and the cells 102 shown in FIG. 4. In cells 102, a single partition 112 is used as compared to the separate but opposed sidewalls 50, 64 of drop compartment 42 and lift compartment 44. Further, instead of requiring two openings 60 and 74, fluid communication is simply provided beneath the bottom tip 122 of partition 112. As can be appreciated, several economies of material construction naturally result. Further such economies will be apparent in the embodiments of fluid catalytic crackers according to the present invention disclosed in succeeding figures.

The drawing off of fluidization and lift gases from input atmosphere reservoirs 108 occurs through vents 124. Each vent 124 permits the escape of such gases accumulated in input atmosphere reservoir 108 from a preceding output atmosphere reservoir 110 of an adjacent cell 102. As in the other embodiments, catalyst drawn off with the gases exiting through vent 124 is preferably returned to the cell 102 so that nearly uniform average particle size is maintained throughout the system.

Figure 5:
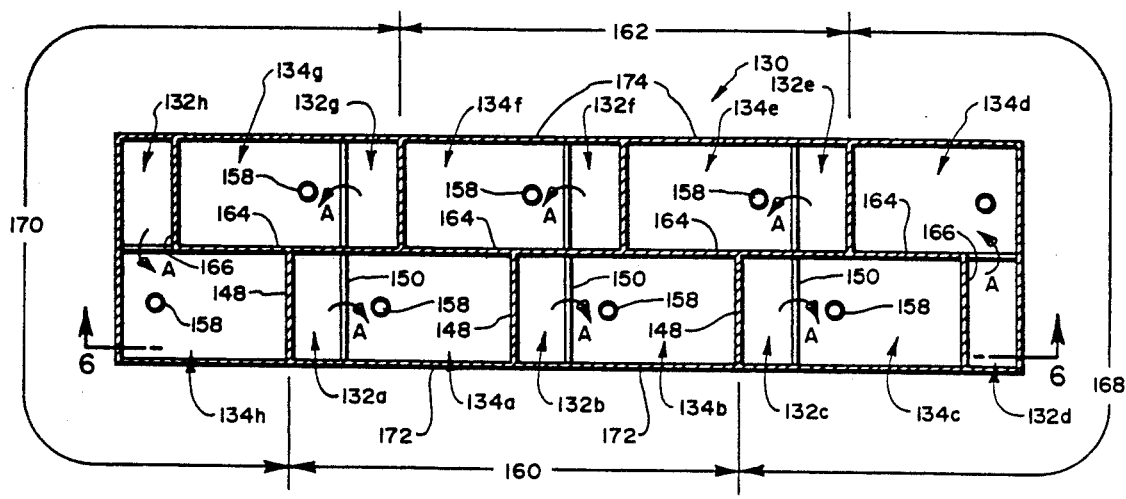
FIG. 5 is a cross-sectional plan view of a fourth embodiment of a fluidized catalytic cracker according to the present invention.
Figure 6:
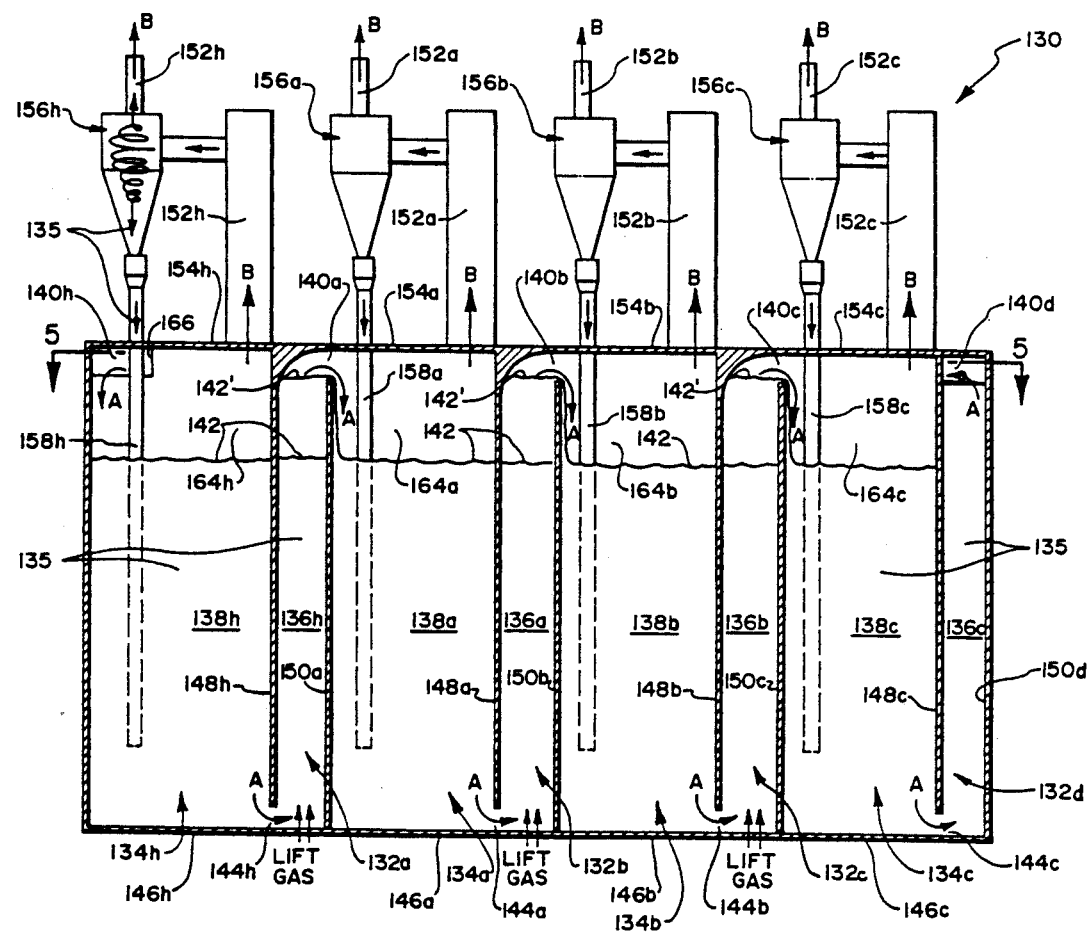
FIG. 6 is a cross-sectional elevation view of the catalytic cracker of FIG. 5 taken along section line 6—6.

D. FIGS. 5 and 6

FIGS. 5 and 6 depict a fourth embodiment of a fluid catalytic cracker 130 comprised of a closed succession of alternating lift compartments 132 and drop compartments 134. Contained in lift and drop compartments 132, 134, respectively, is a fluidized catalyst 135. Lift compartments 132 and drop compartments 134 alternate and are in fluid communication in a predetermined flow direction indicated by arrows A. Thus, for example, lift compartment 132a shown in FIG. 6 communicates in a lift mode with drop compartment 134a through an atmosphere opening 140a above top surface 142 of the catalyst lift and drop reservoirs 136, 138, respectively. In turn, drop compartment 134a communicates in the drop mode with succeeding lift compartment 132b through a catalyst opening 144a below top surface 142 of catalyst drop and lift reservoirs 138a, 136a, respectively.

As in the embodiments of fluid catalytic crackers disclosed above, venting in the floors 146 of lift and drop compartments 132, 134 permits gas to be forced through catalyst 135 for fluidization purposes. Therefore, catalyst 135 will flow through openings 144 from a given drop compartment 134 to a successive lift compartment 132 as new catalyst enters each drop compartment 134. This entry of catalyst 135 into each drop compartment 134 is aided by forcing a sufficient volume of lift gas through floor 144 in each lift compartment 132 to raise top surface 142 of catalyst lift reservoir 136 to level 142'.

Catalyst 135 alternately passes beneath partitions 148 between compartments communicating in the drop mode and over partitions 150 between chambers communicating in the lift mode. Partitions 148, 150 serve as common sidewalls for the lift compartments 132 and drop compartments 134 on either side thereof. This results in a highly compact, structurally efficient arrangement of apparatus 130.

Fluidization medium and lift gas introduced into lift and drop compartments 132, 134, exits as shown by arrows B through vents 152. Typically, the exiting gas will carry particles of catalyst. Accordingly each vent 152 is routed through a cyclone separator 156 where such suspended particles of catalyst 135 are removed from the departing gases and returned by way of dip legs 158 to catalyst drop reservoir 138 therebelow. Return of catalyst to the catalyst drop reservoir 138 is also enhanced by designing the size of vent 152 such that vent 152 is large enough so that the larger, heavier particles of catalyst will fall back down into the catalyst drop reservoir 138 simply by the action of gravity. This has an additional advantage that the remaining particles of catalyst which are entrained within the departing gases will tend to be smaller and can therefore be more easily separated by the cyclone separator 156, thereby permitting use of a smaller, less expensive cyclone separator. Thus, overall efficiency with respect to return of the catalyst from the departing gases is enhanced in this manner.

With particular reference to FIG. 5, if heated hydrocarbonaceous feedstock mixed with steam is injected through floors 146 of lift compartments 132a, 132b and drop compartments 134a, 134b, then that section of the apparatus 130 will function as the reactor section 160 in which feedstock is cracking. Similarly, the use of an oxidizing gas, such as air, in lift compartments 132e, 132f and drop compartments 134e 134f will result in that section's functioning as a regenerator section 162.

In catalytic cracker 130, reactor section 160 and regenerator section 162 are parallel one to another sharing a common sidewall 164 at the center of catalytic cracker 130. By this arrangement, waste heat produced by the combustion of coke in regenerator section 162 can usefully and efficiently be transferred to reactor section 160 to maintain desired cracking conditions therein, if appropriate precautions are taken to accommodate expansion and contraction of the various walls 164, 148, 150.

At the remote ends 166 of the central sidewall 164 is found a catalyst advancement passageway 140 by which catalyst 135 advances around the ends 166 of central sidewall 164. Catalyst lift compartments 132c, 132d and catalyst drop compartments 134c, 134d between the output end of reactor section 160 and the input end of regenerator section 162 function as a first barrier section for isolating the atmosphere in reactor section 160 from that in regenerator section 162. Toward this end, steam or other non-combustible, non-oxidizing gas is used in barrier section 168 for fluidization and lift gas purposes. Similarly, lift compartments 132g, 132h and drop compartments 134g, 134h between output end of regenerator section 162 and the input end of reactor section 160 function as a second barrier section 170 toward the same end.

The compact arrangement of lift and drop compartments sharing common walls in catalytic cracker 130 facilitates a simplified construction. Rather than requiring the construction of stand-apart drop and lift compartments as in catalytic cracker 40 in FIG. 2 or even stand-alone catalyst cells as in FIG. 3, catalytic cracker 130 comprises an endless, generally horizontal enclosed conduit having a floor 146, a roof 154, and opposed sidewalls therebetween. In the vicinity of reactor section 160 central sidewall 164 is opposed by exterior sidewall 172, while in the area of regenerator section 162 central sidewall 164 is opposed by exterior sidewall 174. The enclosed conduit thusly defined by floor 146, roof 154, and sidewalls 164, 170, 172 houses the fluidized catalyst flowing therethrough.

The plurality of alternating downwardly depending atmosphere baffles in the form of walls 148 and upwardly extending catalyst baffles in the form of walls 150 connect opposite sidewalls of the conduit. Each catalyst baffle extends upwardly from floor 146 of the conduit to a predetermined point above top surface 142 of catalyst 135. Correspondingly, each atmosphere baffle extends downwardly from roof 154 to a preselected point below top surface 142 of catalyst 135. Thus, while catalytic cracker 130 may be functionally analyzed in terms of a sequence of drop and lift compartments, it can also be structurally comprehended as a single conduit or passageway in which catalyst advances in a predetermined flow direction past an alternating series of catalyst and atmosphere baffles.

Figure 7:
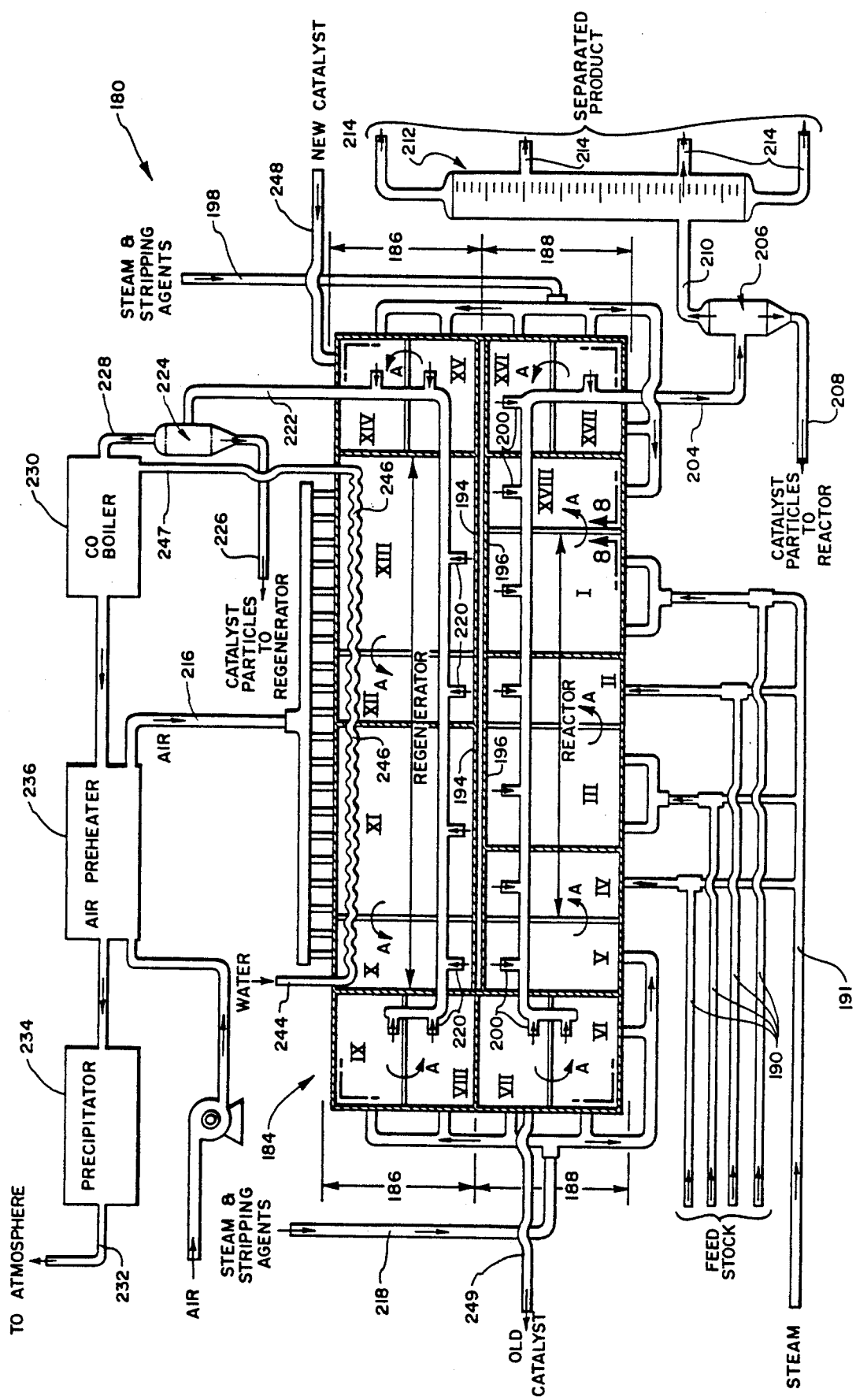
FIG. 7 is a plan view of a fifth embodiment of a catalytic cracker embodying the principles of the present invention and illustrating additional operating structures required external to the catalyst vessels.
Figure 8:
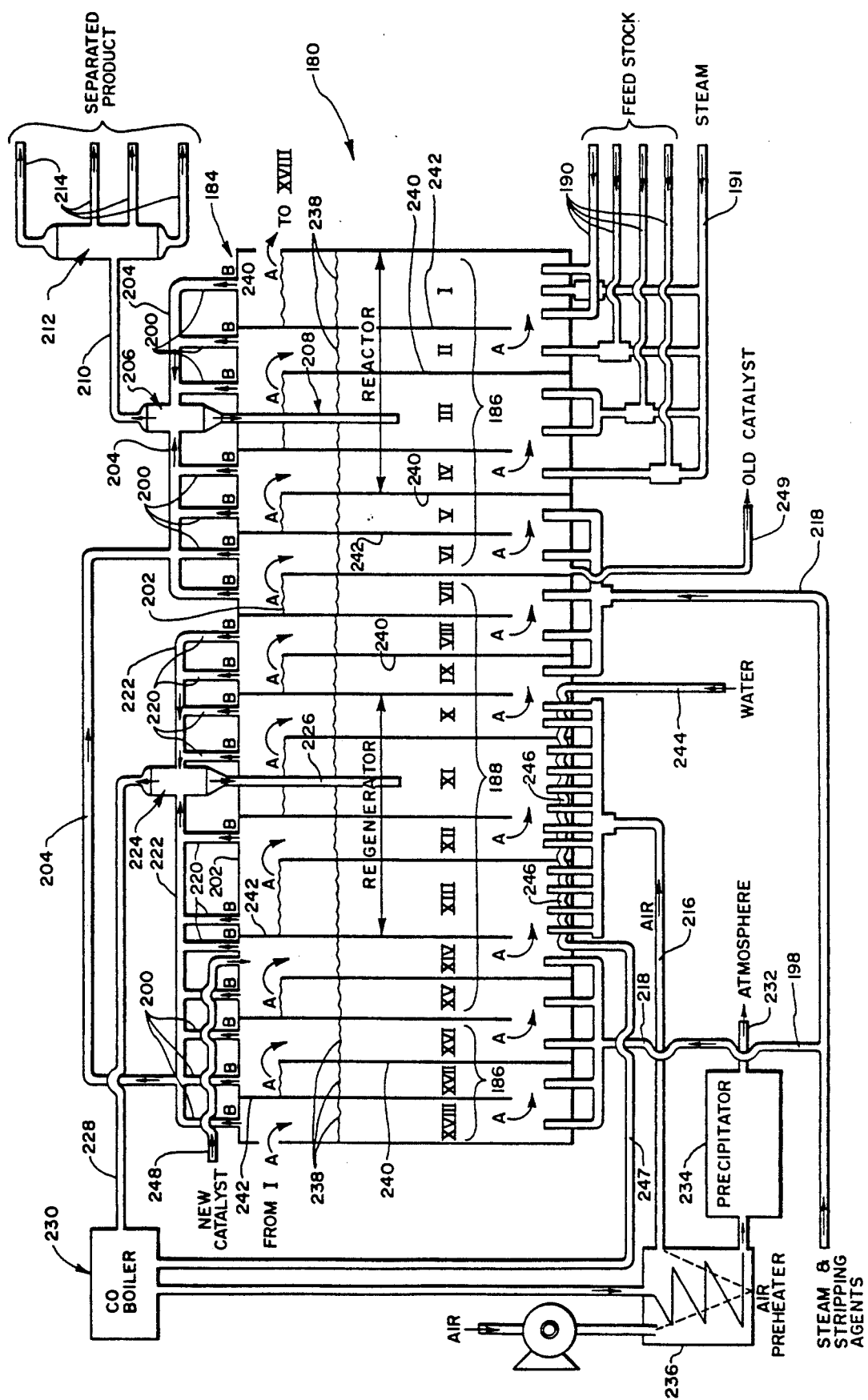
FIG. 8 is a cross-sectional elevation view of the catalytic cracker of FIG. 7 taken along section line 8—8.
Figure 9:
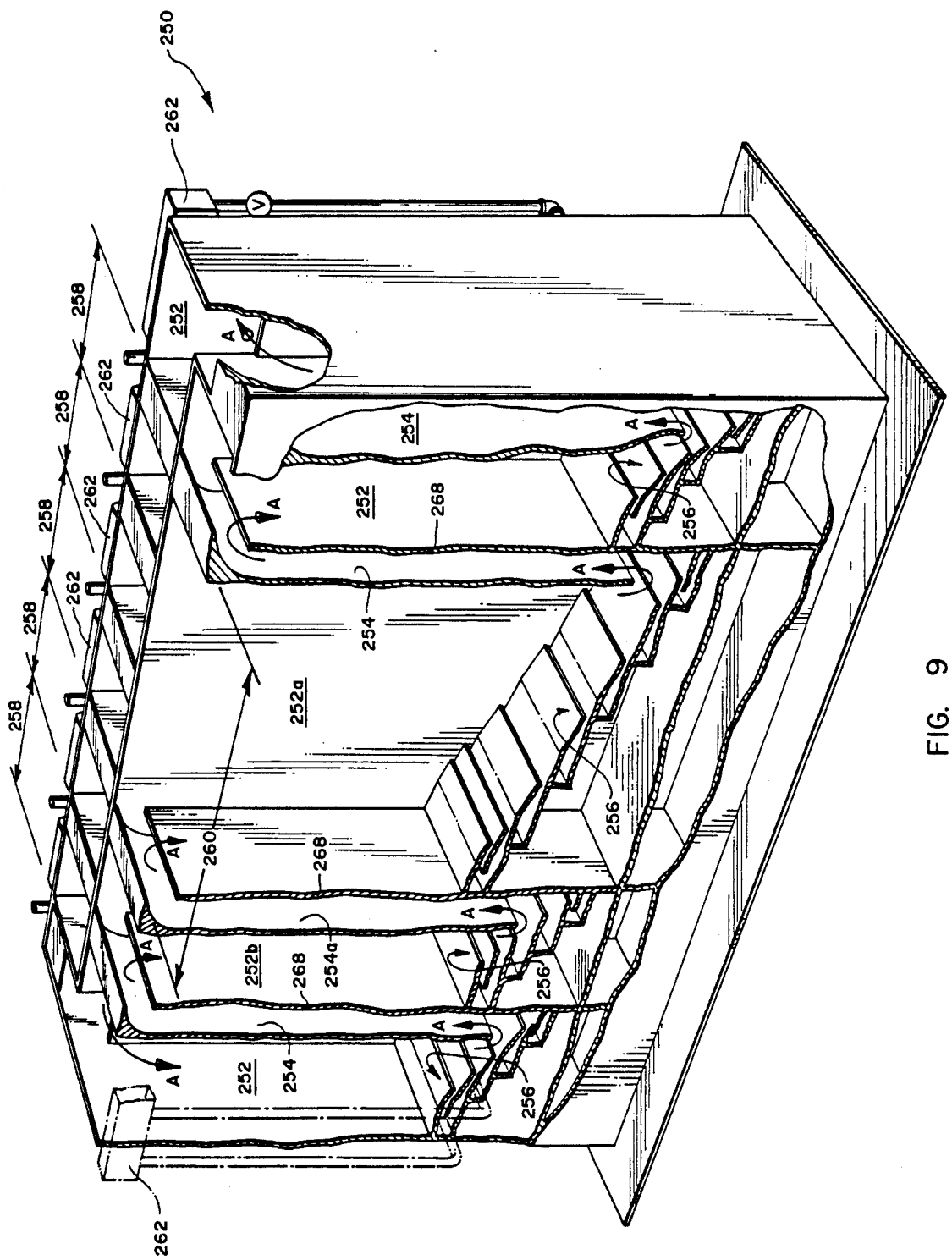
FIG. 9 is a perspective view in partial cross-section of a sixth embodiment of a fluidized catalytic cracker incorporating teachings of the present invention.

D. FIGS. 7 and 8

FIGS. 7 and 8 depict a fifth embodiment of a fluid catalytic cracker 180 embodying principles of the present invention. While catalytic cracker 180 is similar in several respects to catalytic cracker 130, FIGS. 7 and 8 also illustrate structures external to the catalyst vessels which are required to operate the catalytic cracker. As a complete understanding of the structure and operation of catalytic cracker 180 is best derived by taking FIGS. 7 and 8 together, a brief explanation is in order as to the relationship of these two figures.

The catalytic cracker 180 is shown in FIG. 7 in plan view with the roof thereof removed and the walls thereof in cross-hatching. Schematically shown about the periphery of containment structure 184 are those structures external thereto required for correct functioning of catalytic cracker 180. These external structures are arranged in FIG. 7 to facilitate discussion of catalytic cracker 180, rather than to accurately depict the physical relationship therebetween.

The illustration in FIG. 8 is a cross-sectional elevation of catalytic cracker 180 developed by looking horizontally into containment structure 184 and continuing to so look inwardly while passing entirely about the periphery of containment structure 184. As in FIG. 7, structures external to containment structure 184 are schematically shown in FIG. 8 to facilitate an understanding of the structure and operation of the described embodiment.

Catalytic cracker 180 permits the practice of a horizontal cellular fluidized bed process. Containment structure 184 comprises a pair of elongated vessels 186, 188 placed in a side-by-side relationship with various cells labeled with roman numerals I through XVIII formed therein. Specifically, vessel 186 comprises cells VIII through XV, and vessel 188 comprises cells XVI through XVIII as well as I through VIII.

While cells I through XVIII are shown in FIGS. 7 and 8 as having a particular size relationship, these cells can vary in number as well as in size according to the needs of the apparatus in which they are used. Cells I through IV function as reactor cells in which hydrocarbonaceous feedstock is cracked by exposure to catalyst 182. The feedstock enters the reactor at cell IV, and travels in a predetermined flow direction indicated by arrows A to cell I. Cells V through VII at the input end of the reactor section and cells XIV through XVII at the output end thereof function as reactor seal cells to isolate the atmosphere in the reactor from the atmosphere in other portions of containment structure 184. The reactor and the reactor seal cells at either end thereof comprising elongated vessel 188 will be designated hereinafter as reactor-side cells of catalytic cracker 180.

Cells X through XIV function as a regenerator section in which used catalyst is freed of coke deposited thereon in the reactor section. Used catalyst is received at cell XIII, the input end of the regenerator section, and advances therethrough in the predetermined flow direction indicated by arrow A to be discharged therefrom at cell X, the output end of the reactor section. Cells XV and XVI at the input end of the regenerator section and cells VIII and IX at the output end thereof function as regenerator seal cells to isolate the atmosphere of the regenerator section from that of other portions of containment structure 184. The regenerator section and the regenerator seal cells, comprising elongated vessel 186, will be designated hereinafter as the regenerator-side cells. The number and size of cells in both elongated vessels 186, 188 can be varied according to the design objective of catalytic cracker 180.

In the low profile, fluid catalytic cracking process of the invention, hydrocarbonaceous feedstock is preferably preheated using waste heat available from the regeneration section of catalytic cracker 180. Pre-heated hydrocarbonaceous feedstock is introduced into reactor cells I through IV through any or all of feedstock supply pipes 190 which, as best seen in FIG. 8, enter the cells of the reactor section through floor 192 of containment structure 184.

As best understood by reference to FIG. 7, cells VIII through X of the regenerator section are positioned in a side-by-side relationship to the cells I through V of the reactor section. Both the regenerator and reactor sections are provided with common heat conductive walls 194, 196 positioned in a back-to-back relationship for a maximum transfer to the reactor section of waste heat produced in the regenerator section. Appropriate structure to allow for relative expansion and contraction between the reactor-side cells and the regenerator-side cells of catalytic cracker 180 would preferably be included.

Reactor seal cells XV through XVIII at the output end of the reactor section in combination with regenerator seal cells XIV and XV at the input end of the regenerator section function as an atmosphere sealing means to prevent hydrocarbonaceous product gases leaving the reactor section from entering the oxidizing atmosphere in the regenerator section. Steam and other nonoxidizing gases are introduced into reactor seal cells XVI through XVIII and regenerator seal cells XIV and XV through header input pipe 198. As best seen in FIG. 8, these gases enter cells XIV through XVIII through floor 192 of containment structure 184 and pass upwardly through catalyst 182. The gas introduced into cells XIV through XVIII in this manner will, in addition to providing a seal between the reactor and regenerator sections, act as a stripping agent to aid in the removal of any residual quantities of hydrocarbonaceous product gases from catalyst 182 before it advances to the regenerator section.

As best understood by reference to FIG. 8, product gases and nonoxidizing stripping gases exit the reactor-side cells I through VII and XVI through XVIII through vents 200 in roof 202 of containment structure 184. The gases and any entrained catalyst particles are transferred along product gas pipe 204 to one or more cyclone separators 206. The product vapor stream is there partially dedusted and the particles of catalyst 182 thus collected are transferred back to the reactor section through a dip leg line 208. Dedusted product vapor is transferred from reactor cyclone separator 206 to a conventional cracking column 212 by way of product transfer line 210. Various hydrocarbon products from the cracking reaction in the reactor section of catalytic cracker 180 are separated from each other in column 212 and thereafter transported to appropriate disposition sites through separated product lines 214. Separated product from lines 214 may be recycled to the reactor section for further cracking or processing through feedstock supply pipes 190 if desired.

Coke-layden catalyst 182 advances from the output end of the reactor section through reactor seal cells XVI through XVIII and regenerator seal cells XIV and XV for introduction into the regenerator section. There, air or other suitable oxidizing gas is introduced through oxidation header supply line 216. As best seen in FIG. 8, air from supply line 216 enters regenerator cells X through XIII through floor 192 of containment structure 184, functioning as a fluidization medium and lift gas. The catalyst 182 in the regenerator section is thus fluidized and the coke is combusted therefrom, restoring the catalyst 182 to its active state and heating it in preparation for return to the reactor section. Fresh catalyst can be added to catalytic cracker 180 through a fresh catalyst feed pipe 248. Worn out catalyst may be removed from catalytic cracker 180 through a used catalyst line 249 in floor 192.

Regenerator seal cells VIII and IX and reactor seal cells V through VII provide an atmospheric seal to preclude oxidizing gases in the atmosphere of the regenerator section from entering the hydrocarbonaceous atmosphere in the reactor section. Steam or other nonoxidizing gas is introduced into regenerator seal cells VIII and IX and reactor seal cells V through VII through header input pipe 218. As seen in FIG. 8, such nonoxidizing gas enters cells V through IX through floor 192 of containment structure 184, thereby functioning as a fluidization medium and lift gas in those cells.

In addition to providing an atmospheric seal, the gas introduced into cells V through IX by way of input pipe 218 will act as a stripping agent to aid in removing residual amounts of oxygen from fresh catalyst 182 before it enters the reactor section of catalytic cracker 180. The flue gas from combustion in the regenerator section and nonoxidizing stripping gases in regenerator seal cells VIII, IX, XIV, and XV exit from vents 220 in roof 202 of containment structure 184.

The gases and any entrained particles of catalyst 182 are transferred by flue gas pipe 222 to one or more regenerator cyclone separators 224. The combustion flue gas stream is there partially dedusted, and particles of catalyst 182 collected therein are transferred back to the regenerator section through regenerator dip leg line 226. The combustion flue gas leaving regenerator cyclone separator 224 is optionally transferred through a flue gas transfer line 228 to a carbon monoxide boiler 230, where residual carbon monoxide in the combustion flue gas from the regenerator section is burned. Where carbon on catalyst 182 is substantially combusted to carbondioxide in the regenerator section, a carbon monoxide boiler, such as carbon monoxide boiler 230, is not essential.

Eventually the combustion flue gas is vented through discharge line 232. Optionally a portion of the combustion flue gas may be diverted from discharge line 232 into seal supply header input pipes 198, 218 and used as a fluidizing gas medium for seal cells V through IX and XIV through XVIII. In some circumstances it may be desirable to pass the hot combustion flue gas through a precipitator 234 for cleaning purposes or through an air pre-heater 236.

The process of advancing catalyst 182 in the preselected flow direction is best understood by reference to FIG. 8 to involve raising the top surface 238 in lift-type cells, such as cells II, IV, VI, etc. in the preselected flow direction over catalyst barriers 240. Between each catalyst barrier 240 catalyst 182 passes beneath atmosphere baffles 242. In this manner catalyst 182 advances in a generally horizontal direction through the reactor cells, the regenerator cells, and the seal cells of catalytic cracker 180 in a generally sinusoidal course of flow.

Waste heat generated by the combustion of coke in the regenerator section can advantageously be used to generate steam for various purposes. In the embodiment shown in FIGS. 7 and 8, boiler feed water is routed through a boiler feed water line 244 to boiler tubes 246 lining the walls of regenerator cells X through XIV. Steam generated at that location may then be fed, for example, to carbon monoxide boiler 230 through line 248. Alternatively steam generated in this manner may used as a fluidizing medium and lift gas for the reactor and regenerator seal cells or may be consumed elsewhere in the process. Steam required for effective dispersion of the hydrocarbonaceous feedstock can be added to that destined for the reactor section through steam line 191. Steam generated by boiler tubes 245 may also be used to generate electricity for powering equipment associated with the catalytic cracker.

E. FIGS. 9-12

A sixth embodiment of a fluid catalytic cracker 250 shown in FIGS. 9-12 will be utilized to enlarge upon specific aspects of a preferred embodiment of the pneumatic means of the present invention. Briefly, catalytic cracker 250 comprises an endless closed sequence of alternating lift compartments 252 and drop compartments 254 which function substantially in the same manner as drop and lift compartments discussed previously.

Catalytic cracker 250 includes a plurality of reactor cells 258 of substantially uniform dimension which form the reactor section of the apparatus. By contrast, lift compartment 254a and oversized drop compartment 252a comprise the sole regenerator cell in the embodiment of FIGS. 9-12. It has been found advantageous to subdivide the reactor section of a catalytic cracker according to the present invention into a plurality of reactor cells, whereby the flow of hydrocarbonaceous feedstock can be individually controlled and differentiated in separate portions of the reactor. On the other hand, it has been found adequate to include in such a catalytic cracker a single regenerator cell having an extended drop compartment, such as shown at 252a, in which to permit coke combustion to occur in a single compartment.

Catalyst advances laterally through the sequence of compartments in a predetermined flow direction indicated by arrows A. The catalyst is fluidized permitting it to flow freely in the selected flow direction beneath atmosphere baffles 256. Fluidization is effected by a pneumatic means that comprises venting in the floors 256 of the chambers. In catalytic cracker 250 the floors 256 of drop compartments 252 and lift compartments 254 form a single continuous surface sloping downwardly in the selected flow direction.

Figure 10:
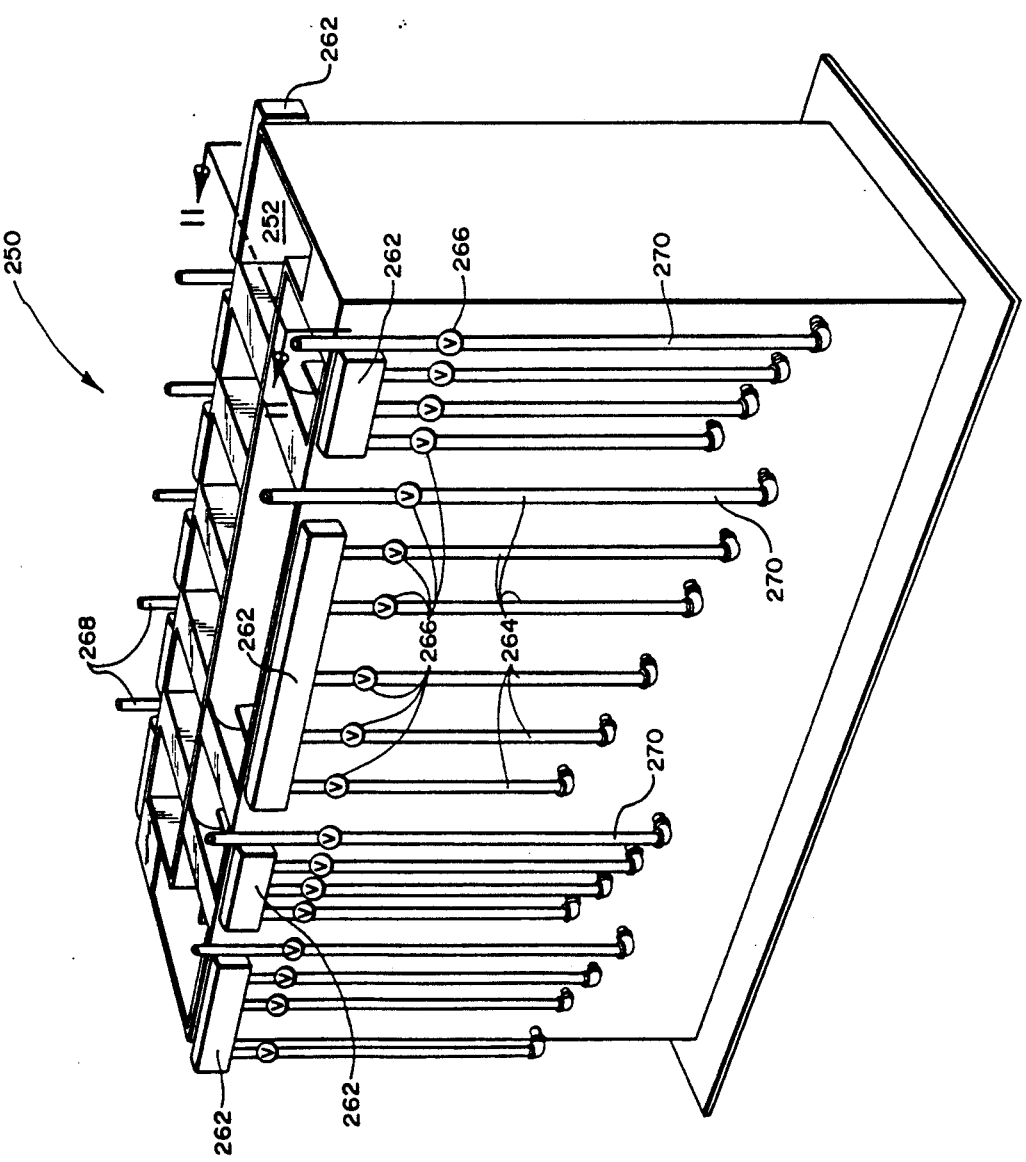
FIG. 10 is a perspective view of the catalytic cracker of FIG. 10 showing pneumatic means external to the catalyst vessels on the back thereof.

Preferably the venting in floors 256 by which catalyst is fluidized should resist clogging when a gas is not passing through the venting, as for example during start-up conditions. The manner in which this may be accomplished is suggested by the overlapping plate structure of floors 256 and the presence of gas distribution headers 262. With reference to FIG. 10, gas for fluidizing the catalyst is supplied from a single gas distribution header 262. From each gas distribution header 262 a plurality of gas distribution lines 264 on the outside of catalytic cracker 250 carry fluidizing gas to beneath floors 256.

Figure 11:
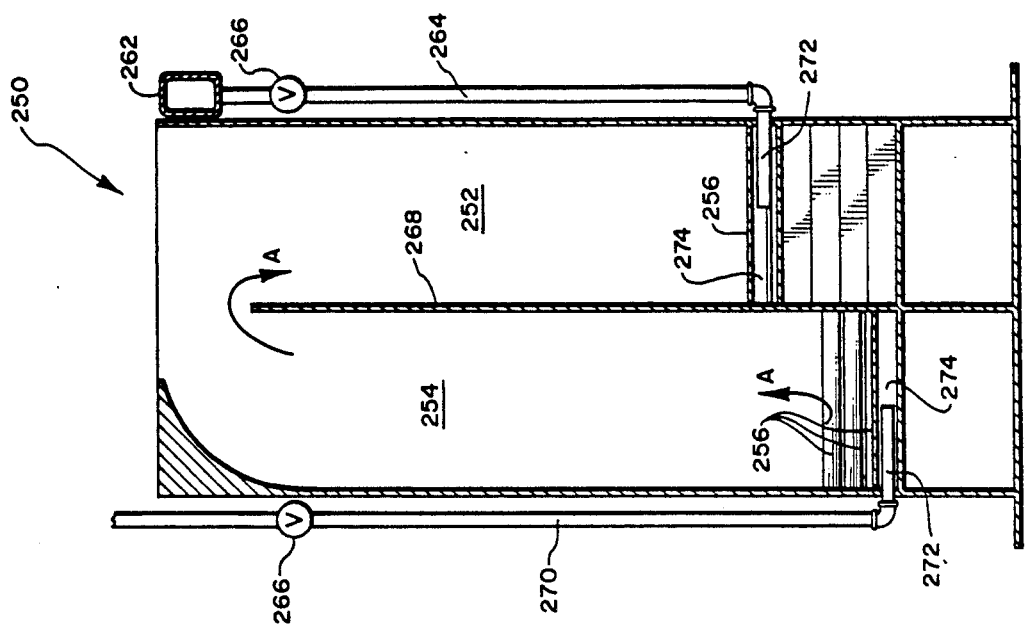
FIG. 11 is a cross-sectional elevation view of the catalytic cracker of FIG. 10 taken along section line 11—11.

As seen in FIG. 11, each gas distribution line 264 turns inwardly at a point below floor 256 and passes under floors 256. Between gas distribution headers 262 and each gas distribution line 264 is a control valve 266 which ensures that the flow rate of gas in lines 264 will remain constant.

In order to efficiently raise the surface of the catalyst in each lift compartment 254 so the catalyst can advance over the catalyst barriers 268, the flow of gas through lift compartment 254 must as a rule, be somewhat greater than that in each drop compartment 252. For this reason, each lift compartment 254 is supplied with gas by a separate lift gas distribution line 270. Lift gas distribution lines 268 also include control valves 266. Both gas distribution lines 264 and lift gas distribution lines 270 terminate in a horizontal stub 272 which communicates with a plenum 274 beneath floors 256.

Figures 12, 13:
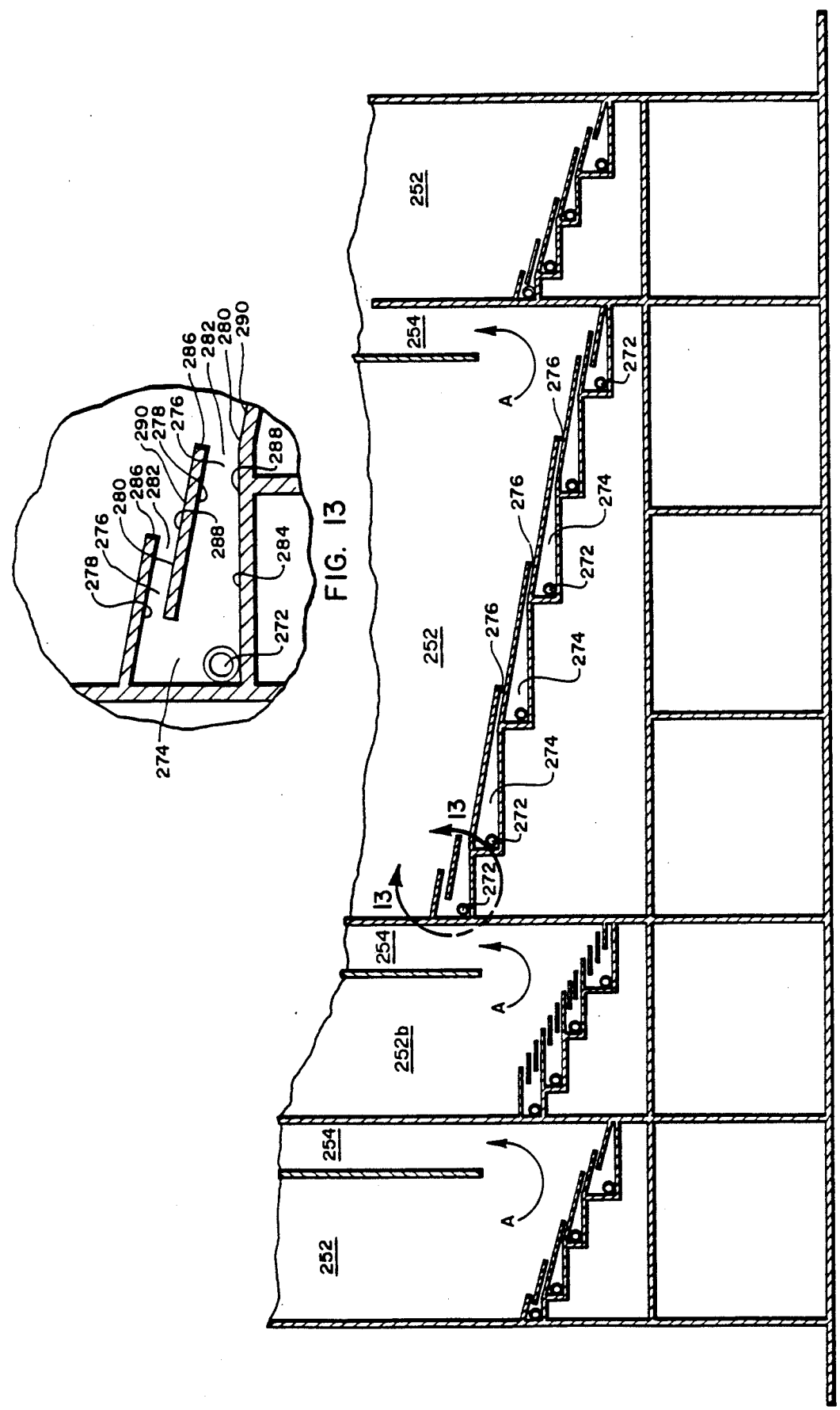
FIG. 12 is a cross-sectional elevation view of a portion of the catalytic cracker of FIG. 10 taken along section line 12—12.
FIG. 13 is an enlarged cross-sectional view of a portion of the catalytic cracker of FIG. 12 taken along section line 13—13.

As best understood by reference to FIG. 12, a preferred venting which resists clogging with catalyst when a gas is not passing through the venting comprises a plurality of gas passageways 276 beneath floors 256 of drop and lift chambers 252, 254, respectively. Gas passageways 276 are defined by overlapping upper surface 278 and lower surface 280. Each gas passageway 276 communicates with gas plenum 274 and accordingly a source of gas under pressure. The opposite end of each gas passageway 276 terminates in a slot 282 formed in floor 256. Typically, slot 282 traverses the width of the chamber in the floor 256. The plane of each gas passageway 276 may be oriented horizontally, as in drop chamber 252b, or downwardly in the direction of the flow of gas through gas passageway 276. In the configuration shown in FIG. 12, slot 282 is formed between an edge 286 of an upper surface 278 and a medial portion 288 of lower surface 280. The portion 290 of lower surface 280 remote from gas passageway 276 comprises a portion of floor 256 of the drop or lift compartment in which slot 282 is formed.

In the absence of venting as described which resists clogging with the catalyst when gas is not passing through the venting, powdered or granular catalyst in the chamber above the venting will tend to seep into the piping, presenting difficulty for start-up operations. Use of gas passageways, such as gas passageways 276 has, however, been found not only to largely eliminate such difficulties, but also to provide for an advantageously uniform distribution of gas for fluidization purposes in each chamber of a fluid catalytic cracker according to the present invention.

In summary, the method and apparatus disclosed herein is a significant departure from the traditional use of massive high profile catalyst reservoirs in fluid catalytic cracking systems. Instead, in the present invention a succession of small low-profile cells are employed. As a consequence, dramatic improvements in mixing and flow characteristics are observed, leading to the elimination of unwanted secondary cracking. Additionally, use of shallow catalyst beds permits fluidization and catalyst advancement to be effected using gas flow at relatively slow velocities. This reduces catalyst attrition as well as internal erosion to the catalyst vessels involved.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of cracking hydrocarbonaceous feedstock, the method comprising the steps of:

fluidizing a catalyst in a succession of enclosed catalyst cells, each of said catalyst cells housing in the bottom thereof a catalyst reservoir and in the top thereof an atmosphere reservoir, and said cells each being provided with means for separating the space above said catalyst reservoir into a first compartment having an input atmosphere reservoir and a second compartment having an output atmosphere reservoir;

laterally advancing said fluidized catalyst through said succession of catalyst cells in a predetermined flow direction by alternately lifting the fluidized catalyst through each of said second compartment and out of said output atmosphere reservoir, and dropping the fluidized catalyst through said input atmosphere reservoir and into said first compartment, whereby said fluidized catalyst continuously advances in a generally horizontal, sinusoidal flow path through said cells;

fluidizing the catalyst in at least a first one of said successive cells with hydrocarbonaceous feedstock mixed with steam such that said cells serve as a reactor section for cracking said feedstock;

fluidizing the catalyst in a second cell with an oxidizing gas such that said second cell serves as a regenerator section for restoring said catalyst to its active state by combustion of coke to remove the coke from said catalyst; and fluidizing the catalyst in third and fourth cells with a nonoxidizing gas so as to establish an atmospheric seal to preclude said oxidizing gas in said regenerator section from entering said reactor section, and so as to preclude said feedstock from entering said regenerator section.

2. A method as defined in claim 1, wherein said first and second cells comprise a common sidewall with said third cell and wherein said method further comprises the step of transferring waste heat from said regenerator section across said common sidewall for utilization in said reactor section.

3. A method as defined in claim 1, further comprising the step of venting said output atmosphere reservoir to an atmosphere external of said second compartment.

4. A method as defined in claim 3, further comprising the steps of separating entrained catalyst which is vented to said external atmosphere with fluidization and product gases drawn from said output atmosphere reservoir, and returning said separated catalyst to said second compartment.

* * * * *

UNITED STATES PATENT AND TRADEMARK OFFICE
CERTIFICATE OF CORRECTION

PATENT NO. : 4,999,100

DATED : March 12, 1991

INVENTOR(S) : MILTON B. THACKER et al.

It is certified that error appears in the above-identified patent and that said Letters Patent is hereby corrected as shown below:

```
Column 3, line 3, after "device" insert --.--
Column 4, line 13, "convention" should be --conventional--
Column 5, line 60, after "elevation" insert --view--
Column 8, line 12, "elswhere" should be --elsewhere--
Column 11, line 9, after "exited" insert --.--
Column 17, lines 52-53, "may used" should be --may be used--
```

Signed and Sealed this

First Day of December, 1992

*Attest:*

DOUGLAS B. COMER

*Attesting Officer*   *Acting Commissioner of Patents and Trademarks*